Dec. 1, 1970     W. E. BURRELL     3,544,802
ALTERNATOR DRIVE MEANS FOR RAILWAY CABOOSE LIGHTING SYSTEM
Filed July 5, 1968     2 Sheets-Sheet 1
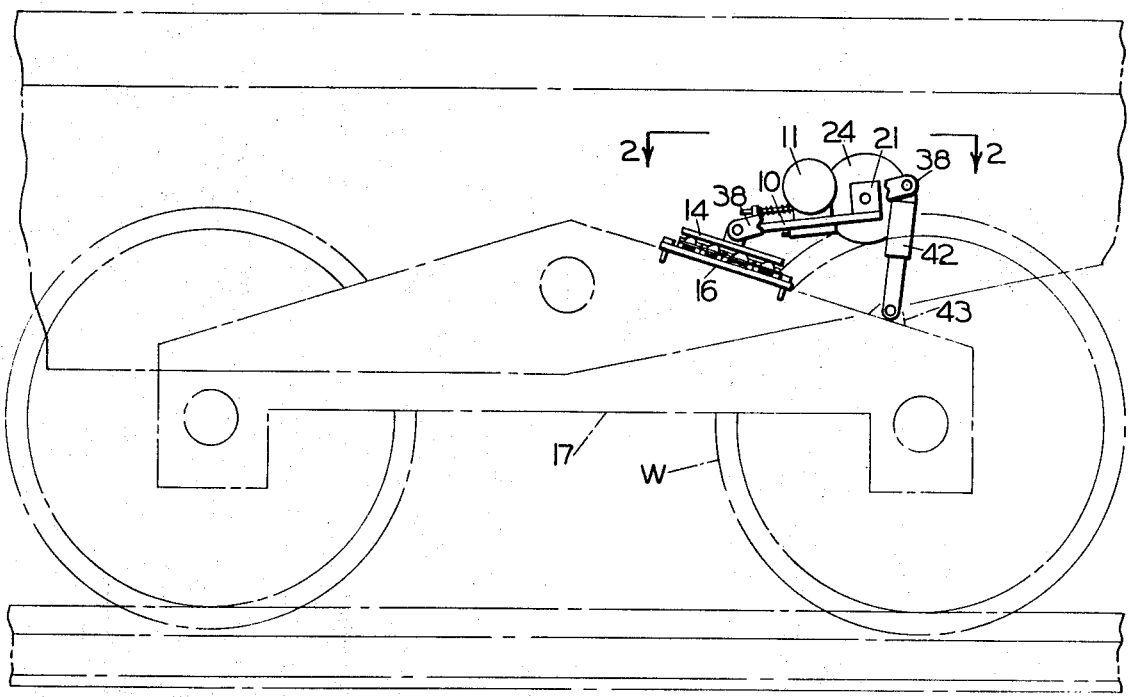
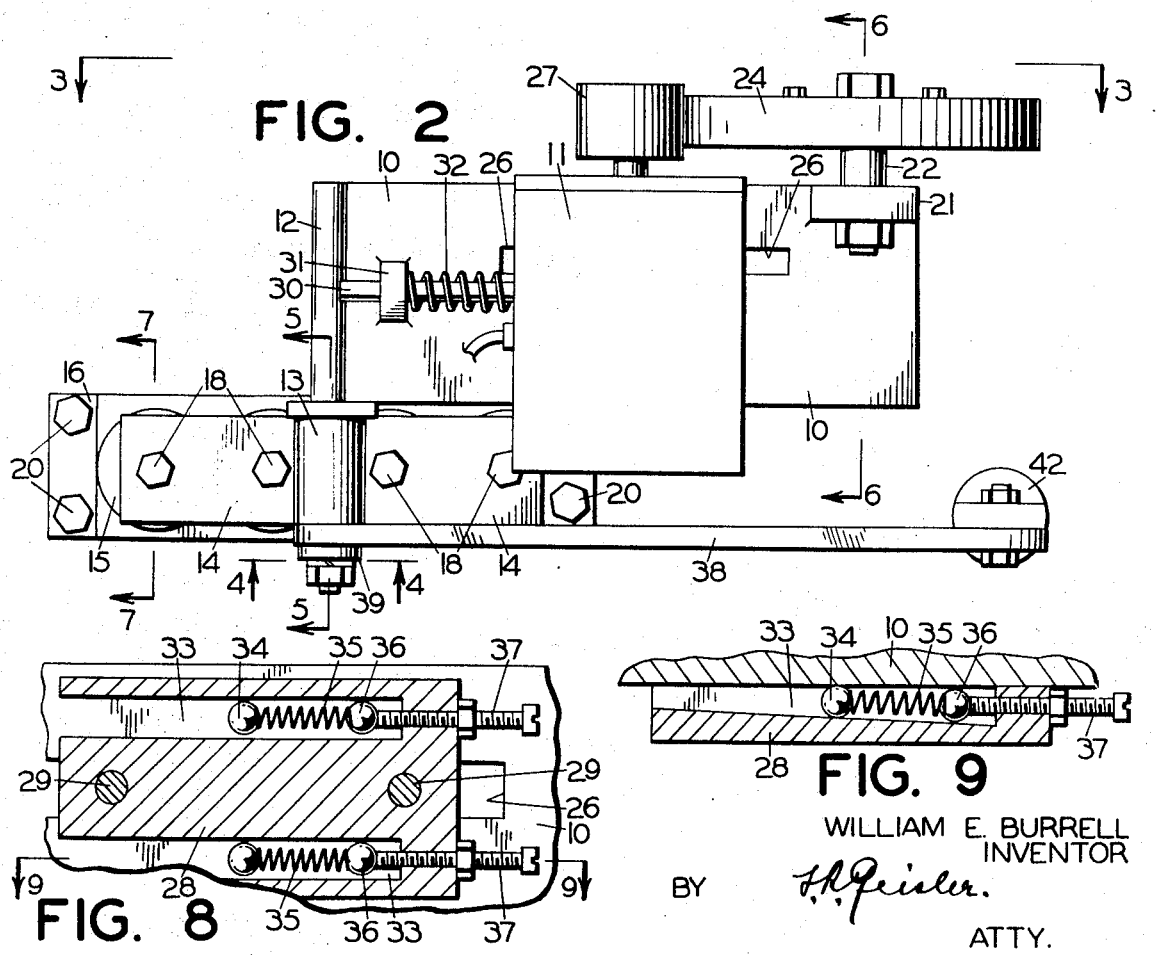
WILLIAM E. BURRELL
INVENTOR
BY *J. R. Geisler*
ATTY.

Dec. 1, 1970  W. E. BURRELL  3,544,802
ALTERNATOR DRIVE MEANS FOR RAILWAY CABOOSE LIGHTING SYSTEM
Filed July 5, 1968  2 Sheets-Sheet 2
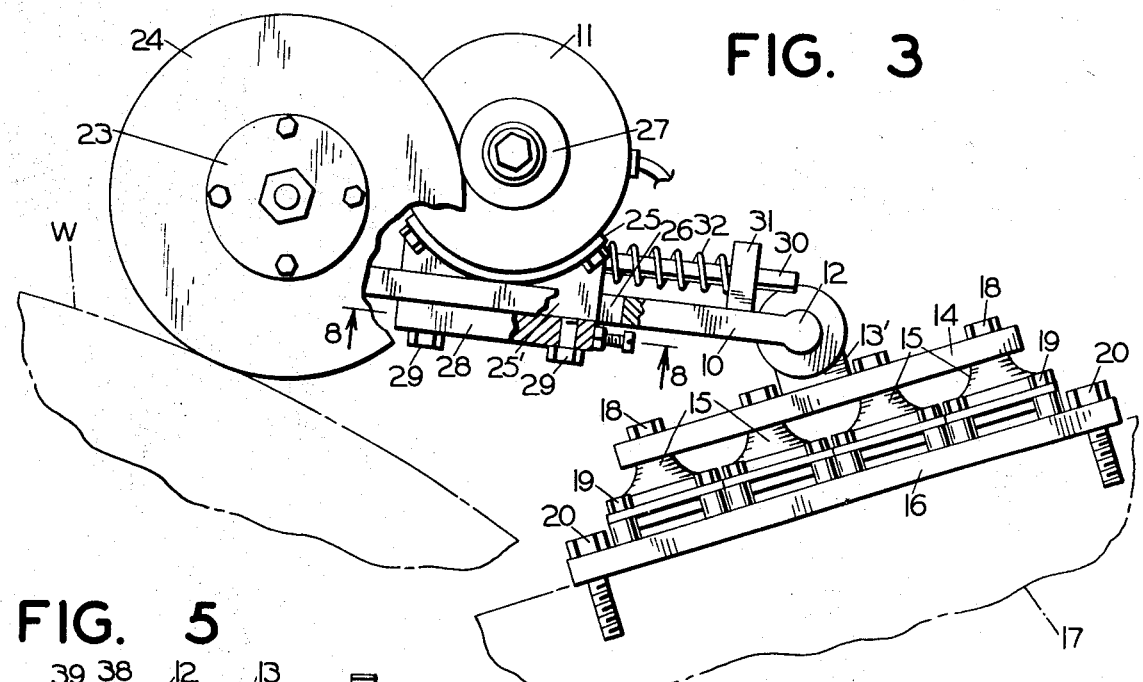
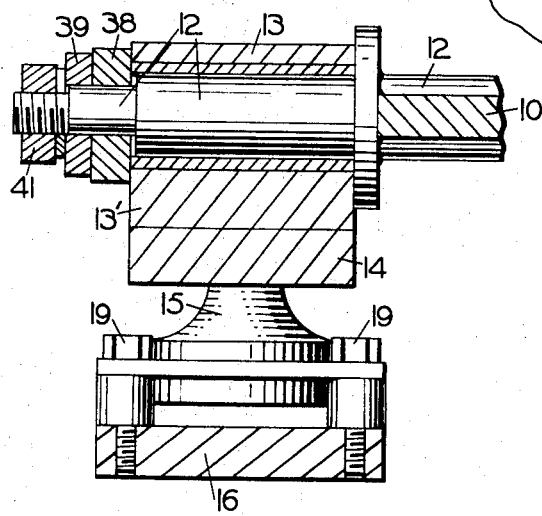
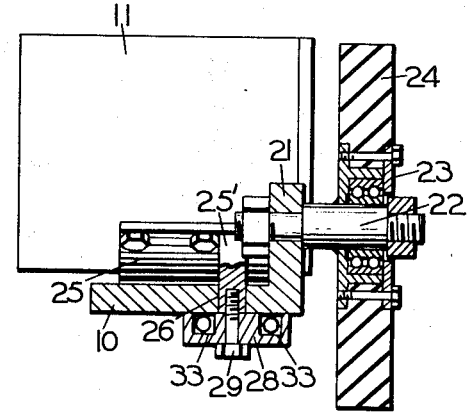
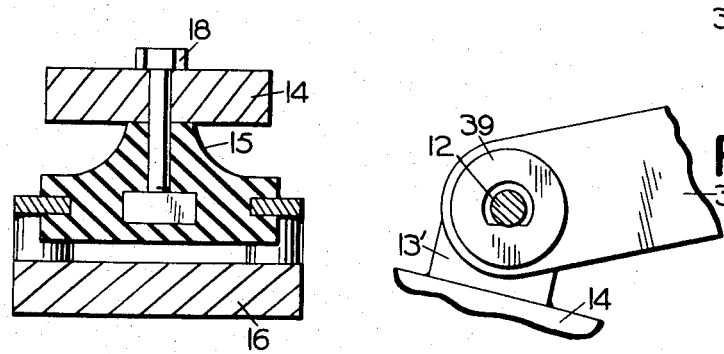
WILLIAM E. BURRELL
INVENTOR.
BY *F. H. Geisler*
ATTY.

United States Patent Office 3,544,802
Patented Dec. 1, 1970

3,544,802
ALTERNATOR DRIVE MEANS FOR RAILWAY CABOOSE LIGHTING SYSTEM
William E. Burrell, 2037 SE. Harold St., Portland, Oreg. 97202
Filed July 5, 1968, Ser. No. 742,866
Int. Cl. B61c *17/00*
U.S. Cl. 290—3                             4 Claims

ABSTRACT OF THE DISCLOSURE

Improved means for driving the alternator for an electric lighting system in a railway caboose in which a specially surfaced take-off wheel rides constantly on the periphery of a track wheel of the caboose and the drive wheel of the alternator is maintained in constant engagement with such take-off wheel under all operating conditions.

BACKGROUND OF THE INVENTION

Various devices have been tried out for producing operation of the alternator in a lighting system for a railway caboose in which such operation is brought about through connection with a track wheel of the vehicle. Such devices generally have included an endless belt driven from an axle connecting a pair of the track wheels, the belt in turn being connected with the drive for the alternator. These devices have not proven entirely satisfactory. A main reason for their unsatisfactory performance has been the fact that such belts are inclined to pick up snow, mud, or other debris from the track bed, which causes slippage of the belts and interference with their proper operation; and also the fact that the belts are subject to somewhat rapid deterioration. The necessity for their adjustment, repair or replacement is frequently overlooked until attention to the same is forced by the failure of the lighting system to function.

An object of the present invention is to provide an improvement in the lighting system for a railway caboose whereby the alternator for the lighting system will be driven from a track wheel but without the employment of any belt connection with the wheel.

A related object is to provide improved driving means for the alternator in such an assembly which would give satisfactory performance at all times during the rotation of the track wheel regardless of the ground surface conditions along the track.

A further and related object is to provide improved driving means for the alternator which will be capable of automatic adjustment compensating for wear in the driving means through which the alternator is connected up with a track wheel of the vehicle.

SUMMARY OF THE INVENTION

In the improved device of the present invention a special transfer wheel, having a thick rim of rubber, rides on a track wheel of the caboose and the rim of the transfer wheel is maintained in constant contact with the rim of the track wheel. The transfer wheel in turn has rim-to-rim contact with a drive wheel on the shaft of the alternator, and this rim-to-rim contact is constantly and automatically maintained through a slidable, spring-controlled carriage on which the alternator, and therewith the drive wheel for the alternator, are supported. A shock absorber minimizes any tendency on the part of the transfer wheel to bounce on the track wheel under rough track conditions, and the engagement of the track wheel with the track keeps the peripheral rim of the track wheel, and therewith the engaging rim of the transfer wheel clear and clean under operating conditions.

BRIEF DESCRIPTION OF THE DRAWINGS

In the accompanying drawings:

FIG. 1 is a side elevation of the alternator and driving assembly showing the same mounted in place on a walking beam of the running gear in a railway vehicle, the vehicle running gear being indicated by broken lines;

FIG. 2 is a top plan view of the alternator and its driving assembly taken on the line indicated at 2—2 of FIG. 1 but drawn to a much larger scale;

FIG. 3 is a side elevation of the alternator and its driving assembly taken on the line indicated at 3—3 in FIG. 2, and thus showing the opposite of the assembly from that indicated in FIG. 1;

FIG. 4 is an enlarged fragmentary sectional elevation on line 4—4 of FIG. 2;

FIG. 5 is an enlarged section on line 5—5 of FIG. 2;

FIG. 6 is a section on line 6—6 of FIG. 2;

FIG. 7 is a section on line 7—7 of FIG. 2 drawn to the same scale as FIG. 5;

FIG. 8 is an enlarged fragmentary section on line 8—8 of FIG. 3; and

FIG. 9 is a fragmentary section on line 9—9 of FIG. 8.

Referring first to FIGS. 1, 2 and 3 the device includes a hingedly-mounted supporting panel 10 on which the alternator 11 for the lighting system is adjustably mounted, as later explained. The panel 10 is secured to a hinge shaft 12 (FIGS. 3 and 5) which is rotatably carried in a bearing support 13.

The bearing support 13 has a base portion 13' formed integral with a plate 14 which plate is secured, through the medium of rubber mounts 15, to a base plate 16. The base plate 16 is firmly bolted to the top of a walking beam 17 (indicated in broken lines in FIGS. 1 and 3). The ends of the axles for the two pairs of track wheels are mounted in the walking beam as usual. The rubber mounts 15, to which the upper plate 14 is secured by the bolts 18 (see also FIG. 7), have notches in their base portions which are engaged by clamping elements attached to the base plate 16 by bolts 19, and the base plate 16 is secured to the walking beam 17 by the bolts 20. This form of cushion mounting for the plate 14 is old in general and no claim of novelty is made for it alone.

The hinge panel 10 has a short integral side wall 21 on the free end of the panel (FIGS. 1, 2 and 6) which supports a stub shaft 22 on which are mounted the bearings for the hub portion 23 of a rubber transfer wheel 24, which transfer wheel rides on the periphery of one of the track wheels W of the vehicle, as shown in FIGS. 1 and 3. The transfer wheel 24, riding on the vehicle wheel, supports the free end of the panel 10 and with it a considerable portion of the weight of the alternator 11, as presently described.

The alternator 11 is secured to a carriage 25 (FIGS. 3 and 6) having a longitudinal, downwardly-extending rib 25'. This rib 25' extends down through a slot 26 in the panel 10, the slot 26 being of sufficient length to allow limited sliding movement of the alternator carriage 25 with respect to the panel 10 and therewith with respect to the transfer wheel 24. The drive wheel 27, secured on the shaft of the alternator, engages the periphery of the rubber transfer wheel 24. A bottom plate 28 (FIGS. 3 and 6) is attached to the rib 25' of the alternator carriage 25 by the bolts 29 and engages the bottom face of the panel 10.

A rod 30 (FIGS. 2 and 3), attached to the alternator carriage 25, and extending from the carriage in a direction opposite from the location of the transfer wheel 24, is slidable through an aperture in a lug 31 which extends up from the top face of the panel 10 and is integral therewith. A coil spring 32 is carried on the rod 30 and is held under compression between the side of the carriage 25 and the lug 31. As apparent, the spring 32 inserts a force tending to move the carriage 25, and therewith the alternator 11 and the alternator drive wheel 27, to the right (as viewed in FIG. 2) and to the left( as viewed in FIG. 3), and thus maintains the drive wheel 27 in constant contact with the transfer wheel 24.

Referring now to FIGS. 8 and 9, the top surface of the bottom plate 28 of the alternator carriage 25 is formed with a pair of identical slots 33 which extend towards that end of the plate 28 nearest the location of the transfer wheel. The bottom of each of these slots slopes upwardly in this direction, as shown in FIG. 9. A locking ball 34 is located in each slot and is pressed toward the shallow end of the slot by a coil spring 35. The inner end of the coil spring 35 bears against an element 36 which in turn is engaged by an adjusting screw 37. From FIGS. 3 and 9 it will be apparent that the locking ball 33 in each slot of the bottom plate of the alternator carriage allows the alternator carriage to be moved towards the left (as viewed in these figures) but holds the carriage against movement in the opposite direction. As previously mentioned, the purpose of the spring 32 is to maintain the alternator drive wheel in constant contact with the transfer wheel 24. This contact is maintained even though some wearing away of the periphery of the rubber transfer wheel takes place. Furthermore, any tendency of the alternator and its carriage momentarily to move away from the transfer wheel under the influence of a shock or jolt received by the vehicle will be prevented by the locking means in the slots 33.

A lever arm 38 (FIGS. 1, 2, 4 and 5) is secured on the end of the hinge shaft 12 outside the bearing support 13. This lever arm 38 and the washer 39 which is welded on the lever arm are formed with an aperture having a flattened wall section which mates with a flattened surface on the portion of the shaft 12 beyond the bearing support 13. A spring ring 40 and a locking nut 41 on the reduced end of the shaft 12 hold the lever arm 38 rigidly secured in place on the shaft 12. A shock absorber 42 (FIG. 1) has its upper end attached to the end of the lever arm 38 and its lower end attached to a pair of ears 43 welded on the top of the walking beam 17. Since the lever arm is rigidly secured to the hinge shaft 12, and the panel 10 is also rigidly secured to the hinge shaft, and the mounting for the stub shaft for the transfer wheel 24 is rigidly secured on the panel 10, the shock absorber 42 acts to prevent any appreciable bouncing of the transfer wheel on the vehicle wheel as a result of up and down vibration which may be imparted to the vehicle wheel when passing over uneven rail sections or which may be produced in the transfer wheel by irregularities developing in the periphery of the vehicle wheel.

Thus the rubber transfer wheel is maintained in constant contact with the vehicle wheel and the contact of the vehicle wheel with the track rail keeps the periphery of the vehicle wheel clean. Moreover, this contact of the transfer wheel with the vehicle wheel will be maintained regardless of wear on the rubber transfer wheel. Furthermore, the contact of the drive wheel 27 of the alternator with the transfer wheel will also be constantly maintained and will be maintained regardless of ordinary wear of the transfer wheel. In this way continuous reliable operation of the alternator is made certain during the travel of the caboose.

While the transfer wheel has been described as having a periphery of rubber it is to be understood that the term "rubber" in this specification is intended broadly to include any other suitable rubber-like or relatively soft or resilient material which, when forming the periphery of the transfer wheel, would minimize any tendency of the transfer wheel to skid or slip on the surfaces of the peripheries of the vehicle wheel or alternator drive wheel.

I claim:

1. In an electric lighting system for a railway vehicle, an alternator, a panel supporting said alternator, supporting means for one end of said panel, a mount for said supporting means on the railway vehicle, a transfer wheel mounted on the other end of said panel, said transfer wheel so positioned and located as to ride on the wheel of the vehicle and thereby support said other end of said panel, a driving wheel on said alternator, a carriage for said alternator movable on said panel, said carriage mounted for slidable adjustment on said panel and so arranged as to bring said alternator driving wheel into peripheral contact with said transfer wheel, spring means mounted on said panel engaging said carriage for moving said carriage with respect to said panel and exerting a force constantly urging said alternator drive wheel against said transfer wheel, a periphery of rubber-like material on said transfer wheel, whereby driving rotation will be constantly transmitted to said driving wheel of said alternator from the vehicle wheel through the medium of said transfer wheel during the travel of the vehicle.

2. The combination set forth in claim 1 with the addition of locking means cooperating with said spring means for said alternator carriage on said panel for preventing said alternator, and therewith said alternator driving wheel, from moving in a direction away from said transfer wheel, whereby any shifting movement of said alternator and alternator driving wheel relative with respect to said panel will be restricted to movement towards said transfer wheel.

3. The combination of claim 2 with the addition of cushioning elements in said mount for said supporting means for said first mentioned end of said panel and with said locking means on said panel for said alternator carriage operating automatically.

4. The combination set forth in claim 1 with the addition of a shock absorber assembly connected to the railway vehicle acting on said other end of said panel and therewith on said transfer wheel to reduce any tendency for said transfer wheel to bounce on the vehicle and on said vehicle wheel during the travel of the vehicle.

References Cited

UNITED STATES PATENTS

| | | | |
|---|---|---|---|
| 568,209 | 9/1896 | Rodriguez | 310—75 X |
| 644,823 | 3/1900 | Heidel | 310—75(.3) |
| 1,210,639 | 1/1917 | Geisslinger | 310—75(.3) |
| 2,088,029 | 7/1937 | McDermott | 310—75(.3) |
| 2,547,700 | 4/1951 | Graham | 105—133 |
| 2,971,477 | 2/1961 | Ireland | 105—133 |

G. R. SIMMONS, Primary Examiner

U.S. Cl. X.R.

105—329, 49; 310—75; 290—1